United States Patent
Kundu et al.

(10) Patent No.: US 8,914,758 B1
(45) Date of Patent: Dec. 16, 2014

(54) EQUIVALENCE CHECKING USING STRUCTURAL ANALYSIS ON DATA FLOW GRAPHS

(71) Applicant: Synopsys, Inc., Mountain View, CA (US)

(72) Inventors: Sudipta Kundu, Hillsboro, OR (US); Carl Preston Pixley, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/903,967

(22) Filed: May 28, 2013

(51) Int. Cl.
*G06F 17/50* (2006.01)
*G06F 9/455* (2006.01)

(52) U.S. Cl.
CPC .................. *G06F 17/5045* (2013.01)
USPC ....................................................... 716/107

(58) Field of Classification Search
CPC . G06F 17/504; G06F 17/505; G06F 17/5022; G06F 17/5081; G06F 17/5045
USPC ....................................................... 716/107
See application file for complete search history.

(56) References Cited

U.S. PATENT DOCUMENTS

| | | | |
|---|---|---|---|
| 7,222,317 B1 * | 5/2007 | Mathur et al. | 716/107 |
| 7,263,673 B1 * | 8/2007 | McElvain et al. | 716/103 |
| 7,343,575 B2 | 3/2008 | Bjesse et al. | |
| 7,890,894 B2 | 2/2011 | Bjesse et al. | |
| 8,001,498 B2 | 8/2011 | Bjesse | |
| 8,104,000 B2 | 1/2012 | Bjesse | |
| 8,627,260 B1 * | 1/2014 | Bjesse | 716/132 |
| 2008/0134114 A1 | 6/2008 | Bjesse et al. | |
| 2009/0300560 A1 * | 12/2009 | Weber et al. | 716/5 |
| 2010/0077366 A1 | 3/2010 | Bjesse | |
| 2013/0152030 A1 * | 6/2013 | Drane et al. | 716/104 |

OTHER PUBLICATIONS

Stoffel, Dominik, and Wolfgang Kunz. "Equivalence checking of arithmetic circuits on the arithmetic bit level." Computer-Aided Design of Integrated Circuits and Systems, IEEE Transactions on 23.5 (2004): 586-597.
Stoffel, Dominik, and Wolfgang Kunz. "Verification of integer multipliers on the arithmetic bit level." Proceedings of the 2001 IEEE/ACM international conference on Computer-aided design. IEEE Press, 2001.
Per Mattias Bjesse, Bit-Level Simplification of Word-Level Models, U.S. Appl. No. 13/665,800, filed Oct. 31, 2012.
Ted Stanion. Fast Verification of Complex, but Reasonable, Datapaths. IEEE 7th International Workshop on Microprocessor Test & Verification (MTV), Austin, Texas, USA, 2006.

* cited by examiner

*Primary Examiner* — Vuthe Siek
*Assistant Examiner* — Magid Dimyan
(74) *Attorney, Agent, or Firm* — Adams Intellex, PLC

(57) ABSTRACT

A design is verified by using equivalence checking to compare a word-level description of the design to a bit-level description of the design. A word-level data flow graph (DFG) based on the word-level description and a bit-level DFG is obtained. Structural analysis is used to reduce the graphs and partition them into smaller portions for the equivalence checking. The analysis includes searching the bit-level DFG to find partial-product encoding and removing redundancy from the bit-level DFG. A reference model with architectural information from the bit-level DFG is created based on the word-level DFG. The reference model is reduced and equivalence checked against the bit-level DFG to determine if the word-level description is equivalent to the bit-level description.

34 Claims, 6 Drawing Sheets

```
{PP₇₀,PP₆₀,PP₅₀,PP₄₀,PP₃₀,PP₂₀,PP₁₀,PP₀₀}   = booth_encoding (B₁, B₀, 0)
{PP₇₁,PP₆₁,PP₅₁,PP₄₁,PP₃₁,PP₂₁}             = booth_encoding (B₃, B₂, B₁)
{PP₇₂,PP₆₂,PP₅₂,PP₄₂}                        = booth_encoding ( 0, 0, B₃)

function booth_encoding (bit B2, bit B1, bit B0)
switch ({B2, B1, B0})
    case 3'b000: return  0;
    case 3'b001: return  A;
    case 3'b010: return  A;
    case 3'b011: return  2*A;
    case 3'b100: return -2*A;
    case 3'b101: return -A;
    case 3'b110: return -A;
    case 3'b111: return  0;
}
```

FIG. 2

EQUIVALENCE CHECKING USING STRUCTURAL ANALYSIS ON DATA FLOW GRAPHS

FIELD OF ART

This application relates generally to semiconductor circuits and more particularly to verification of semiconductor circuits.

BACKGROUND

Modern electronic systems are often very large and complex, and may be built from tens or even hundreds of millions of transistors, making these systems difficult and expensive to design and validate. Market demands may require systems to possess ever-increasing performance, advanced feature sets, system versatility, and a variety of other rapidly changing system specifications. These demands often introduce contradictory design requirements into the design process. System designers are required to make significant tradeoffs in performance, physical size, architectural complexity, power consumption, heat dissipation, fabrication complexity, and cost, among others, to try to best meet design requirements. Each design decision exercises a profound influence on the resulting electronic system. To handle such electronic system complexity, designers create specifications and design electronic systems around the specifications. The specifications attempt to balance the many disparate demands being made of the electronic systems and contain the exploding design complexity.

The process of comparing proposed designs to the specifications around which they were constructed helps ensure that the designs meet critical system objectives. The process of comparison is called verification. Logic systems may be described at a variety of levels of abstraction, from low-level transistor layouts to high-level description languages. Most designers describe and design their electronic systems at a high-level of abstraction using an IEEE Standard hardware description language (HDL) such as Verilog™, SystemVerilog™, or VHDL™. Often, a high-level HDL is easier for designers to understand, especially for a vast system, as the high-level HDL may describe highly complex concepts that are difficult to grasp using a lower level of abstraction. A HDL description may be converted into another, lower level of abstraction if helpful to the developers. For example, a high-level description may be converted to a logic-level description such as a register-transfer language (RTL), a gate-level (GL) description, a layout-level description, or a mask-level description. Each lower level of abstraction introduces more detail into the design description.

Many of the steps in a design automation chain may be performed using a correct-by-construction model. The lower-levels of abstraction may be generated automatically by computer, derived from a design library, or created by another design automation technique. For example, the generation of a gate-level description from a logic-level description can be easily verified for equivalence due to a one-to-one correspondence between a construct in the RTL and a set of gates in the gate-level description. But other steps may be more difficult to verify. In some cases, a section of the design may be manually constructed to optimize for certain parameters, and two different abstractions of the design may not share a one-to-one correspondence. In other cases, the design complexity may preclude easy verification, using the automated tool, that the design's output is equivalent to the design's input. Ultimately, it is critical to ensure that the performance of any produced lower-level designs still matches the requirements of the system specification and still provides the desired logic function.

SUMMARY

A design is verified by using equivalence checking to compare a word-level description of the design to a bit-level description of the design. A word-level data flow graph (DFG) based on the word-level description is obtained, and a bit-level DFG based on the bit-level description is also obtained. Structural analysis is used to reduce the graphs and partition them into smaller portions for equivalence checking. The analysis includes searching the bit-level DFG to find partial-product encoding, and removing redundancy from the bit-level DFG. A computer-implemented method for verification analysis is disclosed comprising: obtaining a word-level data flow graph and obtaining a bit-level data flow graph; searching the bit-level data flow graph to find partial-product encoding; removing redundancy from the bit-level data flow graph; and performing equivalence checking using the bit-level data flow graph and the word-level data flow graph.

The method may further comprise generating a reference model based on the word-level data flow graph. The reference model may be further based on architectural information from the bit-level data flow graph. The reference model may include a summation of individual partial products. The method may further comprise reducing the bit-level data flow graph by finding adders, to produce a reduced bit-level data flow graph. The adders, which are found, may be half-adder and full-adder logic circuits. The reducing may include identifying a current slice where the current slice includes partial products or a carry from a previous slice. The method may further comprise cutting a carry node and a sum node from one of the adders from the bit-level data flow graph; removing corresponding inputs from the current slice; adding the sum node, which was cut, to the current slice; and adding the carry node, which was cut, to a next slice. The reducing of the bit-level data flow graph may be performed in parallel with reducing of the reference model, to produce a reduced reference model. The performing of equivalence checking may include checking between the reduced bit-level data flow graph and the reduced reference model. The obtaining the word-level data flow graph may be accomplished by converting a specification into the word-level data flow graph. The obtaining of the bit-level data flow graph may be accomplished by converting an implementation into the bit-level data flow graph. The method may further comprise checking the word-level data flow graph and the bit-level data flow graph for input correspondence. The method may further comprise checking the word-level data flow graph and the bit-level data flow graph for output correspondence. The partial-product encoding may correspond to a known architecture. The searching may identify nodes corresponding to the partial-product encoding. The method may further comprise cutting the nodes corresponding to the partial-product encoding to produce a remaining design. The remaining design may include a summation of all partial products. The partial-product encoding may include a set of partial products which are summed using an adder tree. The searching of the bit-level data flow graph may be accomplished using binary-decision diagrams. The removing redundancy may include merging duplicate nodes. The word-level data flow graph may be based on a C, C++, SystemC, or RTL representation. The bit-level data flow graph may be based on a C, C++, SystemC, or RTL representation. The bit-level data flow graph may be based on a gate-level representation. The word-level data flow graph may contain at least one operator which operates on a plurality of bits.

In embodiments, a computer system for verification analysis may comprise: a memory which stores instructions; one or more processors coupled to the memory wherein the one or more processors are configured to: obtain a word-level data flow graph and obtain a bit-level data flow graph; search the bit-level data flow graph to find partial-product encoding; remove redundancy from the bit-level data flow graph; and perform equivalence checking between the bit-level data flow graph and the word-level data flow graph. In some embodiments, a computer program product embodied in a non-transitory computer readable medium for verification analysis may comprise: code for obtaining a word-level data flow graph and obtaining a bit-level data flow graph; code for searching the bit-level data flow graph to find partial-product encoding; code for removing redundancy from the bit-level data flow graph; and code for performing equivalence checking between the bit-level data flow graph and the word-level data flow graph.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 2 shows example partial production expressions.

DETAILED DESCRIPTION

Figure 1:
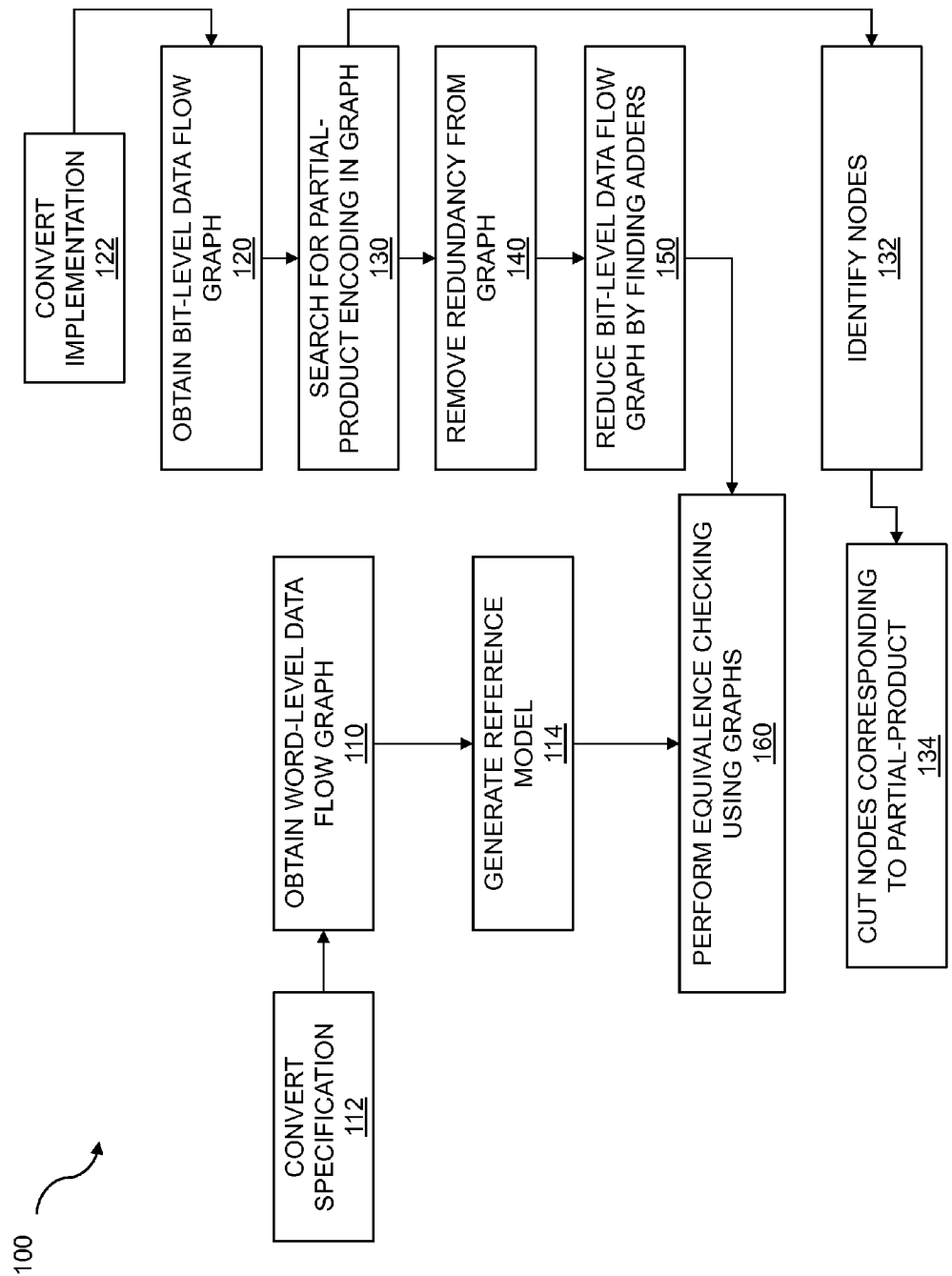
FIG. 1 is a flow diagram for equivalence checking

Verification of designs is a critical part of the development process for semiconductor chips. One source or abstraction of a design must be compared and verified against another abstraction of the design. Ensuring that these differing abstractions match is a difficult process. A word-level and a bit-level description for a design may be compared for equivalence. If the word-level description is found to be equivalent to the bit-level description, the two descriptions may be considered verified against each other. A word-level description utilizes data symbols that represent more than one bit of information and may include complex operators such as arithmetic operations—for example, multiplication, division, addition, and subtraction—as well as multi-bit Boolean operations. In some embodiments, the word-level description may be written in a high level language such as C, C++, SystemC, or another computer programming language. In other embodiments, the word-level description may be in a hardware description language such as Verilog™, SystemVerilog™, or VHDL™, or the like. A bit-level description utilizes single-bit data elements and is limited to single-bit Boolean operations, such as AND, OR, XOR, NOT, etc. However, in some embodiments, a bit-level description may be written in a form where multiple bit elements are represented by a single symbol, as long as only bit-wise Boolean operations are used and there is a one-to-one correspondence to a single-bit representation. The bit-level description is typically in a register-transfer language (RTL) description but may be represented in various other forms including Verilog™, SystemVerilog™, VHDL™, C, C++, SystemC, or another computer programming language.

A word-level data flow graph (DFG) may be generated from the word-level description, although in some embodiments, the word-level description may already take the form of a DFG. A word-level description utilizes data symbols that represent multiple bits of information and may include complex operators such as arithmetic operations—for example, multiplication, division, addition, and subtraction—as well as multi-bit Boolean operations—for example, AND, OR, XOR, and NOT. An arithmetic word-level DFG is a word-level DFG that includes at least one multi-bit arithmetic operator. A bit-level data flow graph (DFG) may be generated from the bit-level description, although in some embodiments, the bit-level description may already be in the form of a DFG. A bit-level DFG utilizes single bit data elements and is limited to single bit Boolean operations, such as AND, OR, XOR, and NOT. However, in some embodiments, a bit-level DFG may be written in a form where multiple bit elements are represented by a single symbol, as long as only bit-wise Boolean operations are used and there is a one-to-one correspondence to a single-bit representation. For example, both the expression $A \cap B$—where A and B each represent 3 bit values—and the equivalent set of expressions, $A_2 \cap B_2$, $A_1 \cap B_1$, and $A_0 \cap B_0$, may be considered bit-level expressions. However A×B—an expression representing the multiplication of two numbers, each represented in 3 bits—is a word-level representation and an arithmetic word-level representation, but not a bit-level representation.

An intelligent structural analysis is performed on the DFGs to partition them and reduce the partitions into smaller portions, enabling the individual portions to be compared for equivalence. The process of individual portion equivalence calculation may take less processing power than performing a comparison of the DFGs as a whole, allowing for faster verification of a design. The techniques described herein may allow some designs, such as those including circuits that perform a sum of products, to be broken into smaller blocks for equivalence checking Most multiplier implementations follow a template, where the implementation first generates a set of partial products and then sums the partial products using some form of an adder tree. Partial products may be identified in the bit-level DFG, and information about the type of partial product found in the bit-level DFG may then be used to generate a reference model from the word-level DFG. A divide-and-conquer approach is then used to verify the design.

In one example, the word-level DFG may represent the expression O=A×B, where 'A' and 'B' are both 4-bit unsigned numbers. The bit-level DFG may describe a 4×4 radix-4 Booth multiplier with inputs $A_3, A_2, A_1, A_0, B_3, B_2, B_1$, and $B_0$, and outputs $O_7, O_6, O_5, O_4, O_3, O_2, O_1$, and $O_0$. Boolean equations for the partial product Booth encoding and Wallace-tree additions may also be included in the bit-level DFG. Depending on the embodiment, various other factors may be included in the bit-level description in order to manage design details such as power, speed, and area.

Equivalence checking can be broken into several portions. In one part, the inputs and outputs of the word-level DFG and the bit-level DFG are compared to verify that there is a one-to-one equivalence of the inputs and a one-to-one equivalence of the outputs between the two DFGs. In another part of the equivalence checking, the bit-level DFG may be searched to find nodes corresponding to the partial product encoding for a known architecture of a multiplier, such as radix-2, radix-4, radix-4 Booth, radix-4 modified Booth, and radix-8 Booth.

Binary decision diagrams (BDDs) may be used to search for the partial product expressions in the bit-level DFG. The use of BDDs may prove efficient because each partial product only involves a small number of Boolean variables. Once all the partial products are found, the partial product nodes may be cut in the bit level DFG by providing virtual inputs for the partial product nodes to over-approximate the design. The design remaining after the cut may be the summation of the partial products.

A reference model may be generated on-the-fly. The reference model may consist of the summation of the individual partial products. Note that, for correctness, the summation of the partial products in the reference model may be shown to be equivalent to the outputs of the cut bit-level DFG, irrespective of the particular adder-tree implementation used in the design. In yet another part of the equivalence checking, redundancy can be removed from the bit-level DFG and/or the reference model. Various rewrites may be used to merge duplicate nodes and remove redundancy from the bit-level DFG. This reduces the chances of getting a false negative due to the cuts (over-approximation) done in the previous part. The approach described herein does not introduce a false positive.

In another part of the equivalence checking, the reference model and the bit-level DFG are reduced by finding half adders and full adders in the DFG. A BDD may be used to find the adders. If an adder is found, the sum and carry nodes of the adder are cut in the bit-level DFG and the corresponding inputs of the adder are removed from their slice, where a slice comprises the set of bit-level DFG nodes that correspond to a partial product or a carry from the previous slice and are used to generate a single bit of the output. A smart search may be used to find the adders in the bit-level DFG. For example, while working on one slice, the XOR tree corresponding to next most significant output is examined and addends which may generate carries corresponding to the inputs from the current slice are found. This search technique is efficient, as the search is focused on a small area of the DFG, and allows various reordering of the XOR trees to handle variations between implementations. This may increase the robustness of the algorithm.

In another part of the equivalence checking, the remaining bit-level DFG with the cuts and the reduced reference model may be checked for equivalence using various generic solvers, such as BDD, SAT, or a combination of solvers. This equivalence checking may be significantly simpler than the original equivalence checking problem.

The various parts of the equivalence checking described above may be implemented as a composite rewrite, which, if a sum of products (SOP) is recognized, replaces corresponding nodes in the bit-level DFG with the word-level expressions from the specification design. Implementing such an approach as a rewrite allows the SOP to be part of a larger verification problem. If the approach fails to recognize the SOP, other techniques, such as random simulation, SAT solvers, and bounded model checking, may be used to find mismatches between the bit-level DFG and the word-level DFG.

Turning now to the drawings, FIG. 1 is a flow diagram for equivalence checking. The flow 100 describes a computer-implemented method for verification analysis. The flow 100 includes obtaining a word-level data flow graph (DFG) 110. In some embodiments, the obtaining of the word-level DFG may be accomplished by converting a specification 112 into the word-level DFG, while other embodiments may directly obtain a word-level DFG without a previously generated specification. The word-level DFG may be based on a C, C++, SystemC, or register-transfer language (RTL) representation in some embodiments, while other embodiments may base the word-level DFG on another type of representation such as, but not limited to, a flow-chart, a representation in another computer programming language, or an English-language specification. The word-level DFG may contain at least one operator which operates on a plurality of bits, such as a multiply operator or an addition operator. Thus, the word-level DFG may be an arithmetic word-level DFG, and, in some embodiments, may represent a sum of products, at least in part. The flow 100 may also include generating a reference model 114 based on the word-level DFG. The reference model may also be based on a bit-level DFG. The bit-level DFG can be analyzed to evaluate possible architectures and configurations of the logic. These architectures and configurations can be used to look up possible models from a database of stored reference models. The reference models may give a starting point from which to work on a word-level DFG. In some cases multiple reference models can be identified and a subsequent evaluation performed to pick one that best matches the bit-level design implementation. It should be understood that many reference models could provide functional equivalent operation but the goal is to find a reference model which closest approximates the implementation details of the design.

The flow 100 includes obtaining a bit-level data flow graph (DFG) 120. The bit-level DFG may be the graph being compared for equivalence to the word-level DFG. The obtaining the bit-level DFG may be accomplished by converting an implementation 122 into the bit-level DFG. The bit-level DFG may be based on a C, C++, SystemC, RTL representation, or some other high level description, while in some embodiments, the bit-level DFG may be based on a gate-level representation such as a net list, a mask file, Boolean equations, a schematic, or any other gate-level representation.

The bit-level DFG may be examined to determine architectural information about the implementation. Examples of architectural information may include finding portions of the bit-level DFG that correspond to known functionality, which may include, but are not limited to, half-adders, full-adders and partial product encodings. So the flow 100 may include searching the bit-level DFG to find a partial-product encoding 130. In some embodiments, a binary decision diagram (BDD) may be used to search for the partial product expressions. The searching may identify nodes 132 corresponding to the partial-product encoding, and the partial-product encoding may include a set of partial products which are summed using an adder tree. By examining the structure of the partial products within the bit-level DFG, it may be determined that the partial-product encoding may correspond to a known architecture, such as a traditional shift and add radix 2 multiplier, a radix 4 multiplier, a Booth multiplier using a radix of 4 or 8, a modified Booth multiplier, a Dadda multiplier, a Wallace tree, or another known multiplier architectures or combination of architectures.

Once partial products have been found, some embodiments may cut the portion of the bit-level DFG representing the partial products from the bit-level DFG and replace the cut portion of the bit-level DFG using virtual inputs at the nodes corresponding to the partial products. Thus, the flow 100 may further comprise cutting the nodes 134 corresponding to the partial-product encoding to produce a remaining design. The remaining design may include a summation of all partial products, in some embodiments. The cutting may include abstracting the DFG and replacing existing logic with a free input. The flow 100 includes removing redundancy from the bit-level DFG 140. Various rewrites may be used to merge duplicate nodes and remove redundancy from the bit-level DFG. Redundancy may be included in a hardware implementation for loading, speed, or synthesis reasons where the redundant components or nodes are not required logic reasons.

The flow 100 continues by reducing the bit-level data flow graph by finding adders 150 to produce a reduced bit-level data flow graph. Finding the adders in the bit-level DFG may include finding half adders and/or full adders. The adders may then be cut from the bit-level DFG and replaced by virtual inputs for the sum and carry outputs of the adders to partition the bit-level DFG into smaller portions for equivalence checking. The reducing may include identifying a current slice where the current slice includes partial products or a carry from a previous slice.

The reference model that is generated from the word-level DFG may also be based on architectural information from the bit-level DFG. The organization of the partial products and/or adders, as well as other information that may be determined from analysis of the bit-level DFG, may be referred to as architectural information from the bit-level DFG. For example, if the word-level DFG includes a multiplication, and the architectural information extracted from the bit-level DFG indicates that a radix-4 Booth multiplier is being used, the reference model may be generated using a radix-4 Booth architecture for the multiplier of the word-level data flow model. The reference model may still be a word-level model, but one or more of the high-level functions, such as multipliers or multi-input adders, may be broken into lower level constructs such as partial products and adders to sum the partial products. Thus, the reference model may include a summation of individual partial products.

The flow includes performing equivalence checking using the bit-level DFG and the word-level DFG 160. The performing equivalence checking may include checking between the reduced bit-level DFG and the reduced reference model. The reduced complexity of both the reduced bit-level DFG and the reduced reference model renders equivalence checking a much simpler process than if performed on the original bit-level DFG and the original word-level DFG. The lower level blocks, such as the partial products and adders of the reference model, may be compared to the equivalent lower level blocks of the bit-level DFG. The remaining design, or reduced bit-level DFG, can then be compared to the reduced reference model. The equivalence checking for the lower level blocks, as well as the equivalence checking between the reduced bit-level DFG and the reduced reference model, may be performed using any known method or solver, such as a BDD solver, a satisfier (SAT) solver, or a combination of solvers. If equivalence checking fails, a trace may be generated to isolate mismatches in the design. Modifications to the implementation can be recommended or another reference model can be utilized. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

FIG. 2 shows example partial production expressions. The partial products shown may be represented in a bit-level DFG implementing a multiplier using a radix-4 Booth encoding, and, in some embodiments, may also be represented in the reference model. The partial product expressions are shown in the form of pseudo-code 200 designed to implement a radix-4 Booth encoding to multiply an unsigned 4-bit multiplicand, 'A,' by an unsigned 4-bit multiplier 'B.' Other multiplier architectures may use different partial product encodings. A BDD may be used to find partial products in the bit-level DFG. Searches may be done for various types of partial products representing various multiplication algorithms. A determination of which multiplication algorithm is employed by the bit-level DFG may be made based on the types of partial products found. Information on the type of multiplication algorithm implemented may be included in the architectural information about the bit-level DFG.

In radix-4 Booth encoding, the multiplier is evaluated in 3-bit overlapping chunks, with a 0 appended to the right of the least significant bit of the multiplier. The multiplier is extended with 0 to the left as necessary to complete the chunks. The first partial product, $PP_{x0}$, is determined based on a 3-bit word ($B_1$, $B_0$, 0); the second partial product, $PP_{x1}$, is determined based on the 3-bit word ($B_3$, $B_2$, $B_1$); and the third partial product, $PP_2$, is determined based on the 3-bit word (0, 0, $B_3$). If 'B' were a signed integer, the upper two bits would be extended-sign bits instead of 0. The function "booth_encoding" shows how the partial product is determined based on a 3-bit word. If the 3-bit word is '000' or '111,' the partial product is 0. If the 3-bit word is '001' or '010,' the partial product is the multiplicand 'A'. If the 3-bit word is '011,' the partial product is 2×A, or 'A' shifted one bit to the left. If the 3-bit word is '$100_S$,' the partial product is −2×A, or 'A' shifted one bit to the left, and then inverted and incremented by one to form the two's complement version. If the 3-bit word is '101' or '110' the partial product is −A, or 'A' inverted and incremented by one to form the two's complement version.

The three partial products are then shifted to appropriately line up with the middle bit of the three-bit chunk used to select the partial product, so $PP_{x1}$ is shifted 2 bits left and $PP_{x2}$ is shifted 4 bits left, with respect to $PP_{x0}$, and all of the partial products are then sign extended to the total number of bits of the multiplicand and the multiplier combined—8 bits in this example. The partial products are then added to form the product. So, the design may include a summation of all partial products.

Figure 3:
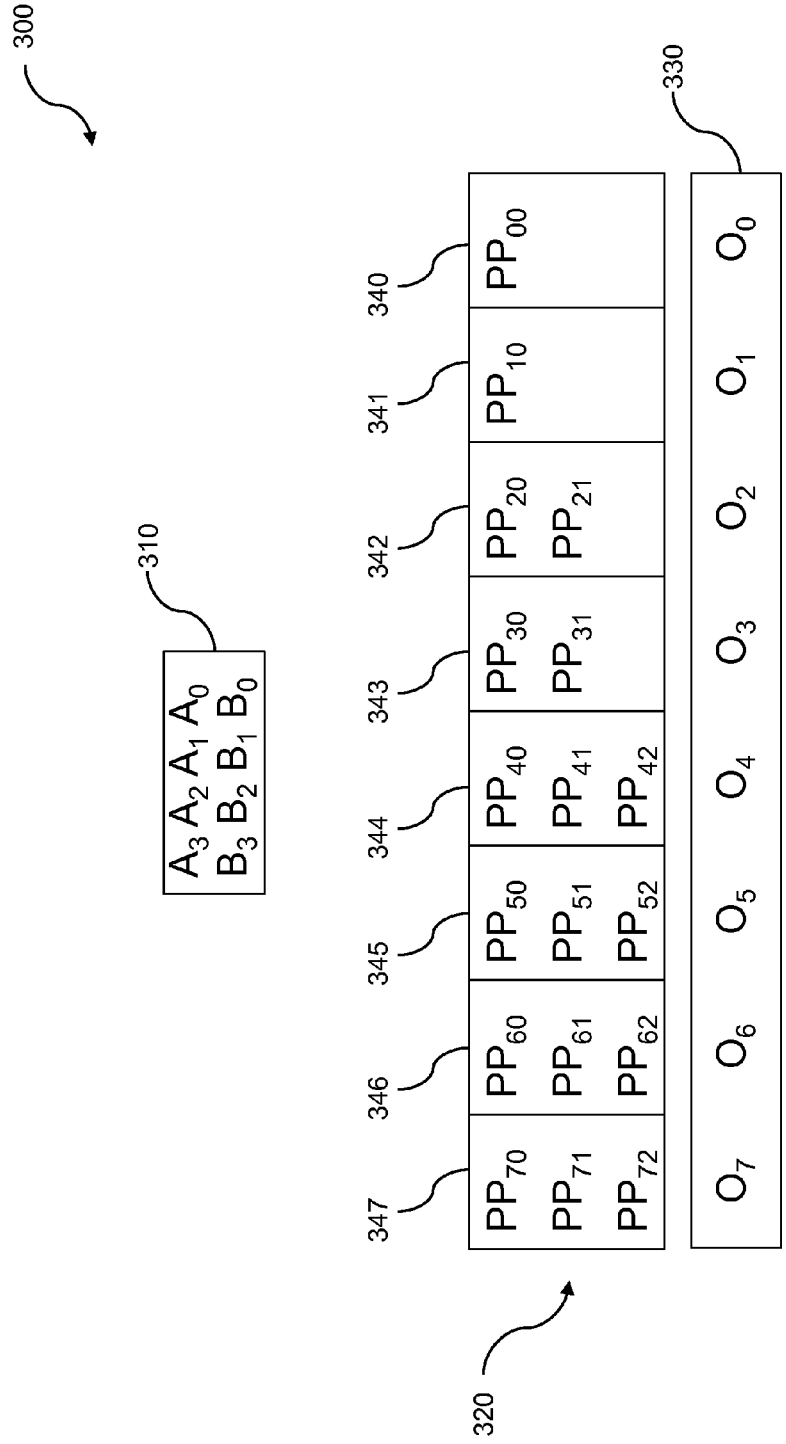
FIG. 3 shows a diagram of an example reference model.

FIG. 3 shows a diagram of an example reference model 300. The reference model 300 may be generated from the word-level DFG. In some embodiments, the reference model 300 may be generated using the bit-level DFG including architectural information. The reference model 300 includes a four bit multiplicand ($A_3$, $A_2$, $A_1$, $A_0$) and a four bit multiplier ($B_3$, $B_2$, $B_1$, $B_0$) as inputs 310. Partial products 320 may be generated as shown in FIG. 2 or by using some other algorithm, depending on the embodiment. The partial products may be found in the bit-level DFG, with the architectural information from the bit-level DFG used to guide the generation of the reference model 300 from the word-level DFG, ensuring that equivalent partial products 320 are included in the reference model 300. The partial products 320 may then be added to generate an 8-bit output 'O' 330. So, the reference model may include a summation of individual partial products.

In some embodiments, slices of an adder may be found that correspond to an output bit; there are eight slices 340-347 in the example reference model 300. A slice may include all the addends that may contribute to that output bit as well as any carries from a previous slice. A single bit of a partial product is included in only one slice. Equivalent slices may be found in the bit-level DFG and may include the bit-level DFG nodes that contribute to the output bit. The nodes in the bit-level DFG may correspond to a partial product or a carry from another slice, where each bit of a particular partial product is included in only one slice.

Figure 4:
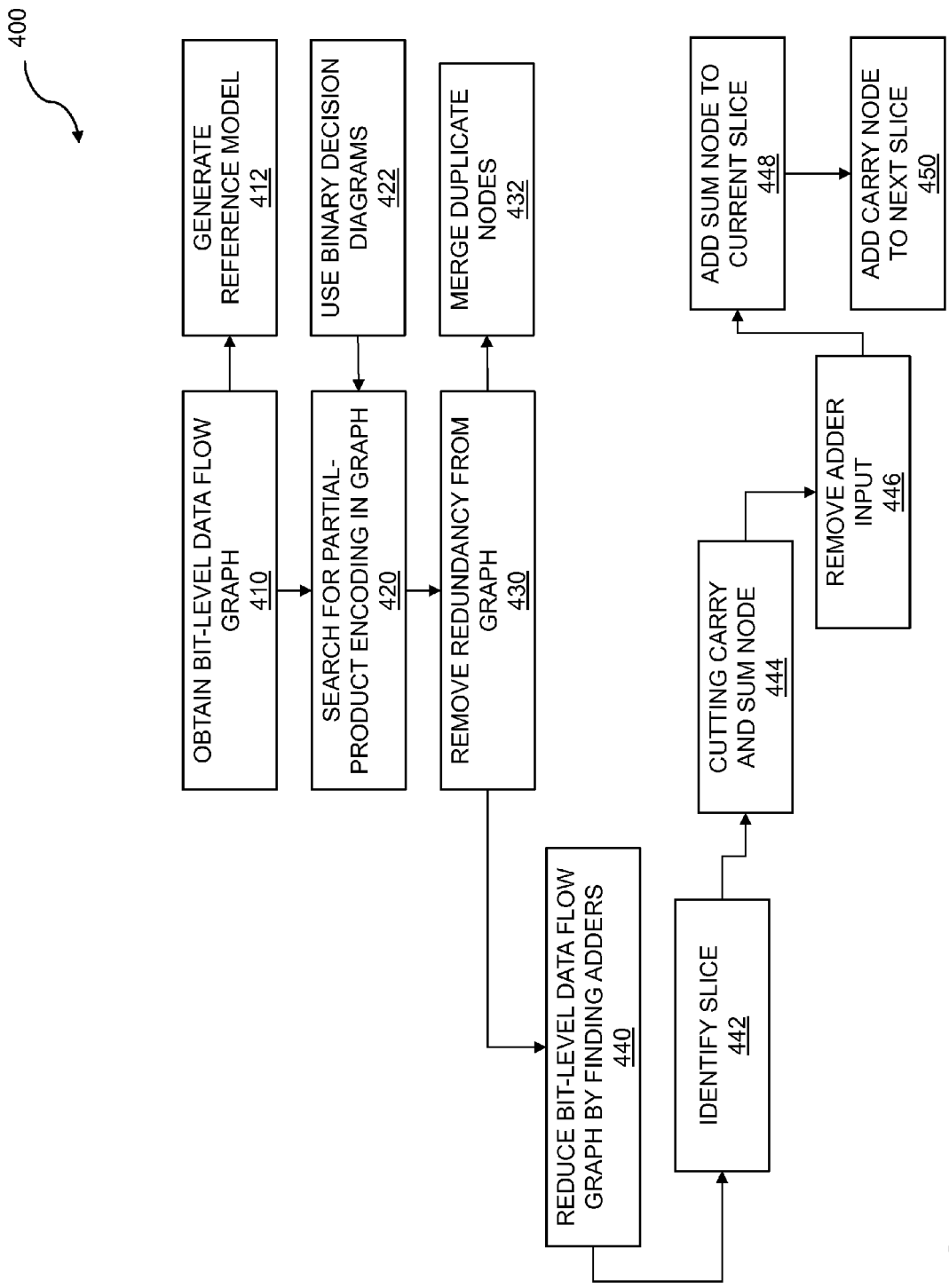
FIG. 4 is a flow diagram for graph reduction.

FIG. 4 is a flow diagram for graph reduction. The flow 400 includes obtaining a bit-level DFG from any type of design description 410. The flow 400 may further comprise generating 412 a reference model using the bit-level DFG. The example reference model 300 of FIG. 3 is used for the discussion of the flow diagram for graph reduction 400. The reference model 300 may also be based on a word-level DFG, in some embodiments. In some embodiments, the bit-level DFG and the reference model 300 may be reduced together. The flow 400 continues by searching for partial product encoding in the bit-level DFG 420. In at least some embodiments, the searching of the bit-level DFG may be accomplished using binary-decision diagrams (BDD) 422. A BDD may be efficient at searching the bit-level DFG because each partial product may involve a small number of Boolean variables.

The reducing may be performed, at least in part, by cutting the partial products from the bit-level DFG and the reference model. Because the reference model is generated using architectural information found in the bit-level DFG, there may be equivalent partial products in the bit-level DFG and the reference model. The partial products may be verified to be equivalent using any method including, but not limited to, a BDD solver, a SAT solver, exhaustive testing of all input combinations, or a generic solver. If the partial products are found to be equivalent, they may be cut from both the bit-level DFG and the reference model, and replaced by virtual inputs for the partial products cut.

Redundancy may be removed from the graph 430. Redundancy in the bit-level DFG may occur for many different reasons, but removing the redundancy may simplify the equivalence checking by reducing the size of the graph. The removing redundancy may include merging duplicate nodes 432. A duplicate node may occur where an identical function using identical inputs is instantiated in more than one place in the circuit for performance, layout, or output loading reasons, among others. Merging duplicate nodes in the DFG into a single node in the DFG simplifies the DFG.

The flow 400 may comprise reducing the bit-level DFG by finding adders 440 to produce a reduced bit-level DFG. Some bit-level DFGs and word-level DFGs may describe a sum of products, and therefore the reference model may include a summation of individual partial products. The adders which are found may be half-adder and full-adder logic circuits. A BDD may be used to find the adders, in some embodiments.

The reducing may include identifying 442 a slice where the slice initially includes partial products summed for a particular output bit. The example reference model 300 includes eight slices 340-347. For example, at the start the slice 340 corresponding to output $O_0$ has only one input, $PP_{00}$. The slice 342 corresponding to output $O_2$ has only two inputs, $PP_{21}$ and $PP_{20}$, as does slice 343. Slices 344-347 each include three partial product bits. When a half-adder or a full-adder is found in the bit-level DFG, the sum and carry nodes of the adder are cut 444 in the bit-level DFG and the corresponding inputs of the adder are removed 446 from their slice. The sum node of the adder is then added to the slice 448 that previously included the inputs, and the carry node is added to the next slice 450.

As an example, the slices in the bit-level DFG corresponding to the example reference model 300 are defined as:

| | |
|---|---|
| $S_0 = \{PP_{00}\}$ | 340 |
| $S_1 = \{PP_{10}\}$ | 341 |
| $S_2 = \{PP_{21}, PP_{20}\}$ | 342 |
| $S_3 = \{PP_{31}, PP_{30}\}$ | 343 |
| $S_4 = \{PP_{42}, PP_{41}, PP_{40}\}$ | 344 |
| $S_5 = \{PP_{52}, PP_{51}, PP_{50}\}$ | 345 |

-continued

| | |
|---|---|
| $S_6 = \{PP_{62}, PP_{61}, PP_{60}\}$ | 346 |
| $S_7 = \{PP_{72}, PP_{71}, PP_{70}\}$ | 347 |

The bit-level DFG may then be searched for adders. A half adder has two inputs and Sum and Carry outputs. A full adder has three inputs and Sum and Carry outputs. Not all adders in the bit-level DFG may be found. Given only as an example, the following five adders may be found in the bit-level DFG:

$\{Carry_{30}, Sum_{20}\} = HalfAdder(PP_{21}, PP_{20})$
$\{Carry_{40}, Sum_{30}\} = FullAdder(Carry_{30}, PP_{31}, PP_{30})$
$\{Carry_{60}, Sum_{50}\} = FullAdder(PP_{52}, PP_{51}, PP_{50})$
$\{Carry_{70}, Sum_{60}\} = FullAdder(Carry_{60}, PP_{61}, PP_{60})$
$\{Carry_{71}, Sum_{61}\} = HalfAdder(PP_{62}, Sum_{60})$ The bit-level DFG may be cut at the sum and carry nodes of the adders. Virtual inputs may be coupled to the cut nodes. Equivalent reduction operations may also be performed on the example reference model 300. After the equivalence of the adders is verified, a process which may comprise a simple comparison based on the Boolean logic in the bit-level DFG, the adders found may be removed from both the bit-level DFG and the reference model. After the sum and carry nodes are cut and replaced by the virtual input nodes representing the outputs of the adders, the slices are reduced to:

$S_0 = \{PP_{00}\}$
$S_1 = \{PP_{10}\}$
$S_2 = \{Sum_{20}\}$
$S_3 = \{Sum_{30}\}$
$S_4 = \{Carry_{40}, PP_{42}, PP_{41}, PP_{40}\}$
$S_5 = \{Sum_{50}\}$
$S_6 = \{Sum_{61}\}$
$S_7 = \{Carry_{71}, Carry_{70}, PP_{72}, PP_{71}, PP_{70}\}$ By cutting the nodes and coupling virtual inputs to the cut nodes, the bit-level DFG and the reference model are both divided into smaller portions that are more easily verified against each other, thereby reducing the computational power needed to verify the design and, in some cases, allowing previously unverifiable designs to be verified.

Thus, the flow 400 may further comprise cutting a carry node and a sum node from one of the adders from the bit-level DFG, removing corresponding inputs from the slice, adding the sum node, which was cut, to the current slice, and adding the carry node, which was cut, to a next slice. The reducing of the bit-level DFG may be performed in parallel with the reducing of the reference model to produce a reduced reference model. Various steps in the flow 400 may be changed in order, repeated, omitted, or the like without departing from the disclosed concepts. Various embodiments of the flow 400 may be included in a computer program product embodied in a non-transitory computer readable medium that includes code executable by one or more processors.

Figure 5:
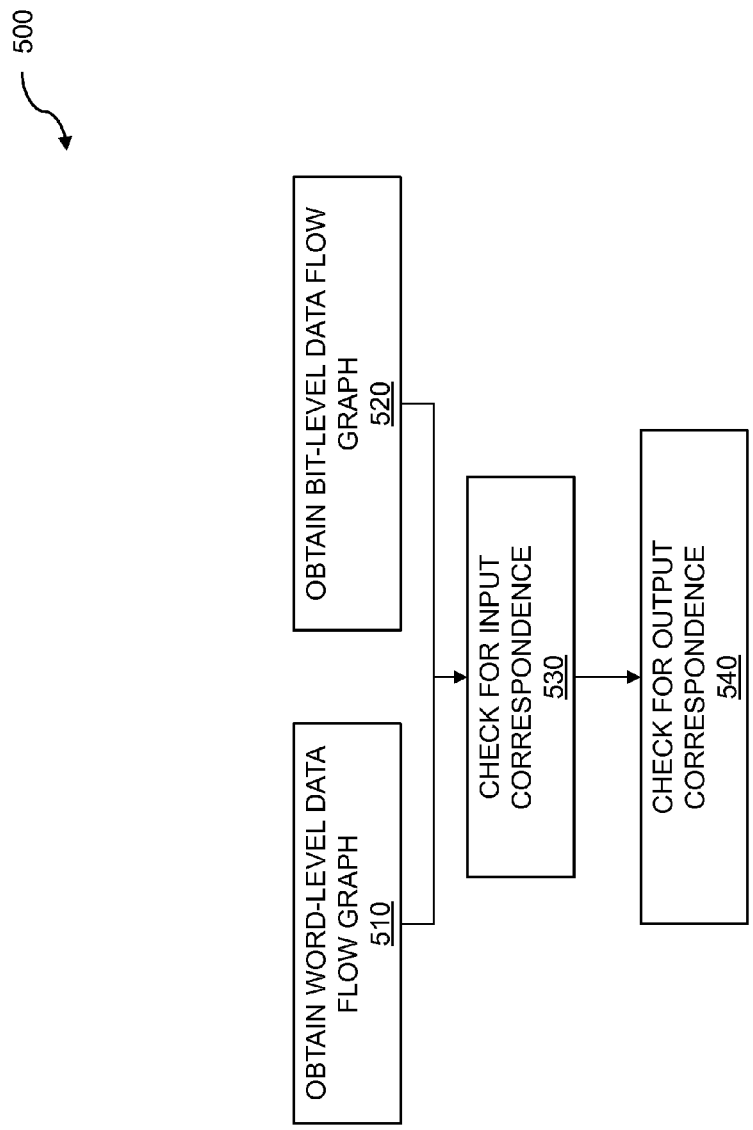
FIG. 5 is a flow diagram for checking graph inputs and outputs.

FIG. 5 is a flow diagram for checking graph inputs and outputs. The flow 500 includes obtaining a word-level data flow graph (DFG) 510. The word-level data flow graph may be based on a C, C++, SystemC, or RTL representation, in some embodiments. The flow 500 also includes obtaining a bit-level data flow graph (DFG) 520. The bit-level data flow graph may be based on a C, C++, SystemC, or RTL representation, in some embodiments.

The flow 500 may comprise checking the word-level DFG and the bit-level DFG for input correspondence 530. The inputs of the word-level DFG and the bit-level DFG may be shown to be equivalent, even if the inputs are represented in different forms. That is, while the word-level DFG may use multi-bit symbols to represent multiple inputs and bit-level DFG may use single bit symbols, a one-to-one correspondence at the bit level may be identified between the inputs of the word-level DFG and the bit-level DFG.

The flow 500 may further comprise checking the word-level DFG and the bit-level DFG for output correspondence 540. The outputs of the word-level DFG and the bit-level DFG may be shown to be equivalent, even if represented in different forms. That is, while the word-level DFG may use multi-bit symbols to represent multiple outputs and the bit-level DFG may use single bit symbols, a one-to-one correspondence at the bit level may be identified between the outputs of the word-level DFG and the bit-level DFG. Further, the remaining portion of the bit-level DFG after reduction—the portion that is coupled to an output node of the bit-level DFG—may be shown to be equivalent to the portion of the reference model remaining after reduction—the portion that is coupled to an equivalent output bit of the word-level DFG. Equivalence may be shown by any known method.

By performing the actions described above, the bit-level DFG may be compared to the word-level DFG for equivalence. In some embodiments, the comparison may show that a word-level description in C, C++, or SystemC is equivalent to a bit-level description in a register-transfer language (RTL) representation. In other embodiments, the comparison may show that a word-level description in RTL is equivalent to a bit-level description in RTL. In still other embodiments, the comparison may show that a word-level description in RTL is equivalent to a bit-level description in C, C++, or SystemC. In yet other embodiments, the comparison may show that a word-level description in C, C++, or SystemC is equivalent to a bit-level description in C, C++, or SystemC. Various steps in the flow 500 may be changed in order, repeated, omitted, or the like without departing from the disclosed concepts. Various embodiments of the flow 500 may be included in a computer program product embodied in a non-transitory computer readable medium that includes code executable by one or more processors.

Figure 6:
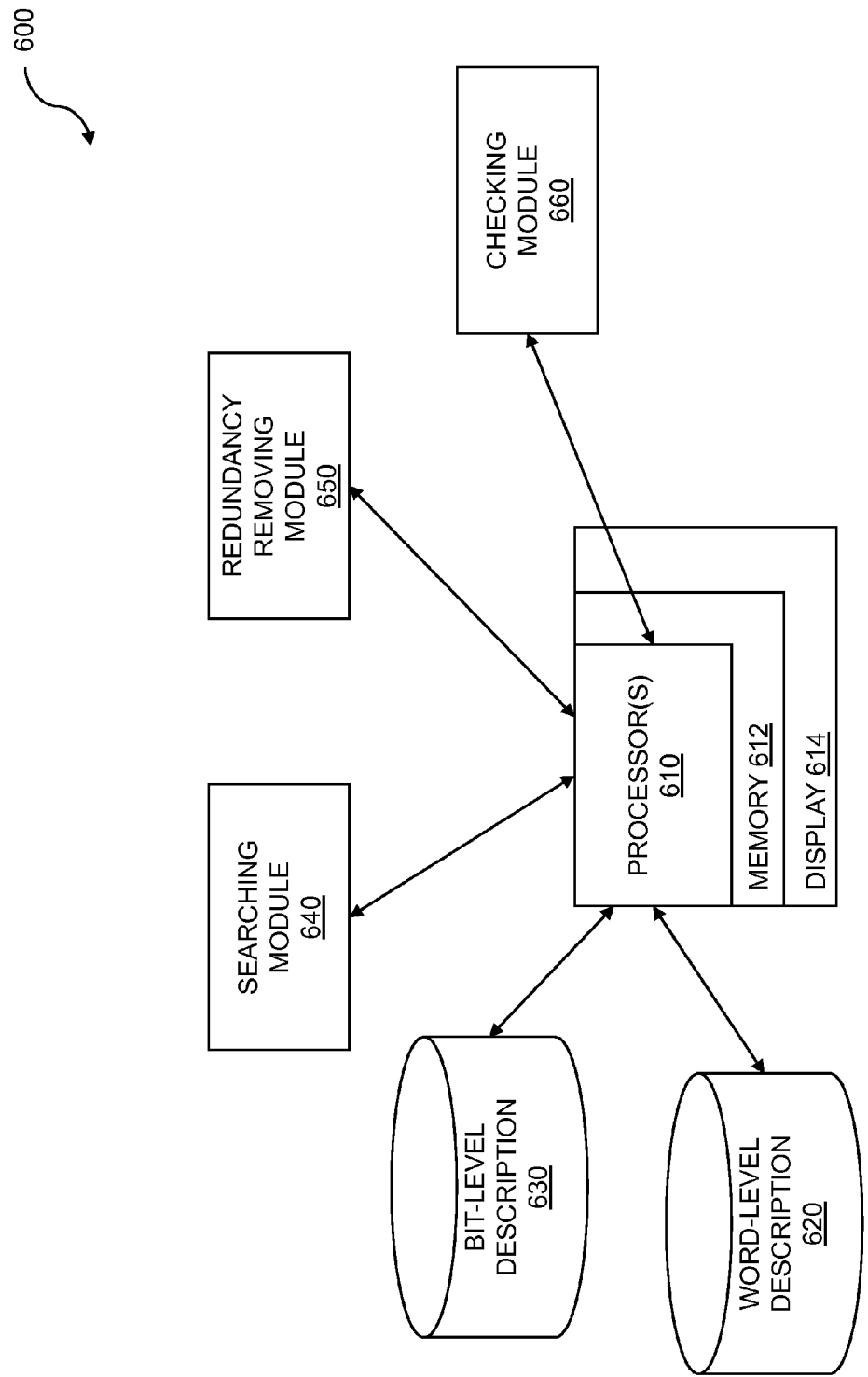
FIG. 6 is a system diagram for equivalence checking.

FIG. 6 is a system diagram for equivalence checking. The system 600 may include one or more processors 610 coupled to memory 612 to store instructions and/or data. The memory 612 may include one or more of a non-transitory computer readable medium such as, but not limited to, a volatile semiconductor memory, a non-volatile semiconductor memory, and/or a rotating magnetic storage media. A display 614 may be coupled to the one or more processors 610, in some embodiments, to allow a user to monitor the progress of the equivalence checking or see results. The display 614 may comprise a television monitor, a projector, a computer monitor (including a laptop screen, a tablet screen, a net book screen, and the like), a cell phone display, a mobile device, or another electronic display.

The system 600 may comprise a computer program product embodied in a non-transitory computer readable medium for verification analysis. The non-transitory computer readable medium may comprise code that is executable by the one or more processors 610. The system 600 may obtain a word-level DFG from a word-level description database 620 and obtain a bit-level DFG from a bit-level description database 630. The system 600 may include a searching module 640 for searching the bit-level DFG 630 to find partial-product encoding, and a redundancy removing module 650 for removing redundancy from the bit-level DFG 630. The system 600 may also include a checking module 660 for performing equivalence checking between the bit-level DFG 630 and the word-level DFG 620. The one or more processors 610 may be configured to obtain a word-level data flow graph, obtain a bit-level data flow graph, search the bit-level data flow graph to find partial-product encoding, remove redundancy from the bit-level data flow graph, and perform equivalence checking between the bit-level data flow graph and the word-level data flow graph.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for verification analysis comprising:

obtaining a word-level data flow graph and obtaining a bit-level data flow graph;
searching the bit-level data flow graph to find partial-product encoding;
removing redundancy from the bit-level data flow graph;
checking the word-level data flow graph and the bit-level data flow graph for input correspondence; and
performing, one or more processors, equivalence checking using the bit-level data flow graph and the word-level data flow graph.

2. The method of claim 1 further comprising generating a reference model based on the word-level data flow graph.

3. The method of claim 2 wherein the reference model is further based on architectural information from the bit-level data flow graph.

4. The method of claim 3 wherein the reference model includes a summation of individual partial products.

5. The method of claim 2 further comprising reducing the bit-level data flow graph by finding adders, to produce a reduced bit-level data flow graph.

6. The method of claim 5 wherein the adders which are found are half-adder and full-adder logic circuits.

7. The method of claim 5 wherein the reducing includes identifying a current slice where the current slice includes partial products or a carry from a previous slice.

8. The method of claim 7 further comprising cutting a carry node and a sum node from one of the adders from the bit-level data flow graph; removing corresponding inputs from the current slice; adding the sum node, which was cut, to the current slice; and adding the carry node, which was cut, to a next slice.

9. The method of claim 7 wherein the reducing of the bit-level data flow graph is performed in parallel with reducing of the reference model, to produce a reduced reference model.

10. The method of claim 9 wherein the performing equivalence checking includes checking between the reduced bit-level data flow graph and the reduced reference model.

11. The method of claim 1 wherein the obtaining the word-level data flow graph is accomplished by converting a specification into the word-level data flow graph.

12. The method of claim 1 wherein the obtaining the bit-level data flow graph is accomplished by converting an implementation into the bit-level data flow graph.

13. The method of claim 1 further comprising checking the word-level data flow graph and the bit-level data flow graph for output correspondence.

14. The method of claim 1 wherein the partial-product encoding corresponds to a known architecture.

15. The method of claim 14 wherein the searching identifies nodes corresponding to the partial-product encoding.

16. The method of claim 15 further comprising cutting the nodes corresponding to the partial-product encoding to produce a remaining design.

17. The method of claim 16 wherein the remaining design includes a summation of all partial products.

18. The method of claim 1 wherein the partial-product encoding includes a set of partial products which are summed using an adder tree.

19. The method of claim 1 wherein the searching of the bit-level data flow graph is accomplished using binary-decision diagrams.

20. The method of claim 1 wherein the removing redundancy includes merging duplicate nodes.

21. The method of claim 1 wherein the word-level data flow graph is based on a C, C++, SystemC, or RTL representation.

22. The method of claim 1 wherein the bit-level data flow graph is based on a C, C++, SystemC, or RTL representation.

23. The method of claim 1 wherein the bit-level data flow graph is based on a gate-level representation.

24. The method of claim 1 wherein the word-level data flow graph contains at least one operator which operates on a plurality of bits.

25. A computer system for verification analysis comprising:
- a memory which stores instructions;
- one or more processors coupled to the memory wherein the one or more processors are configured to:
  - obtain a word-level data flow graph and obtain a bit-level data flow graph;
  - search the bit-level data flow graph to find partial-product encoding;
  - remove redundancy from the bit-level data flow graph;
  - check the word-level data flow graph and the bit-level data flow graph for input correspondence; and
  - perform equivalence checking between the bit-level data flow graph and the word-level data flow graph.

26. The system of claim 25 wherein the one or more processors are further configured to generate a reference model based on the word-level data flow graph.

27. The system of claim 26 wherein the reference model is further based on architectural information from the bit-level data flow graph.

28. The system of claim 26 wherein the one or more processors are further configured to reduce the bit-level data flow graph by finding adders, to produce a reduced bit-level data flow graph.

29. The system of claim 28 wherein reducing includes identifying a current slice where the current slice includes partial products or a carry from a previous slice.

30. A computer program product embodied in a non-transitory computer readable medium for verification analysis comprising:
- code for obtaining a word-level data flow graph and obtaining a bit-level data flow graph;
- code for searching the bit-level data flow graph to find partial-product encoding;
- code for removing redundancy from the bit-level data flow graph;
- code for checking the word-level data flow graph and the bit-level data flow graph for input correspondence; and
- code for performing equivalence checking between the bit-level data flow graph and the word-level data flow graph.

31. The computer program product of claim 30 further comprised of code for generating a reference model based on the word-level data flow graph.

32. The computer program product of claim 31 wherein the reference model is further based on architectural information from the bit-level data flow graph.

33. The computer program product of claim 31 further comprised of code for reducing the bit-level data flow graph by finding adders, to produce a reduced bit-level data flow graph.

34. The computer program product of claim 33 wherein reducing includes identifying a current slice where the current slice includes partial products or a carry from a previous slice.

* * * * *